Figure 1:
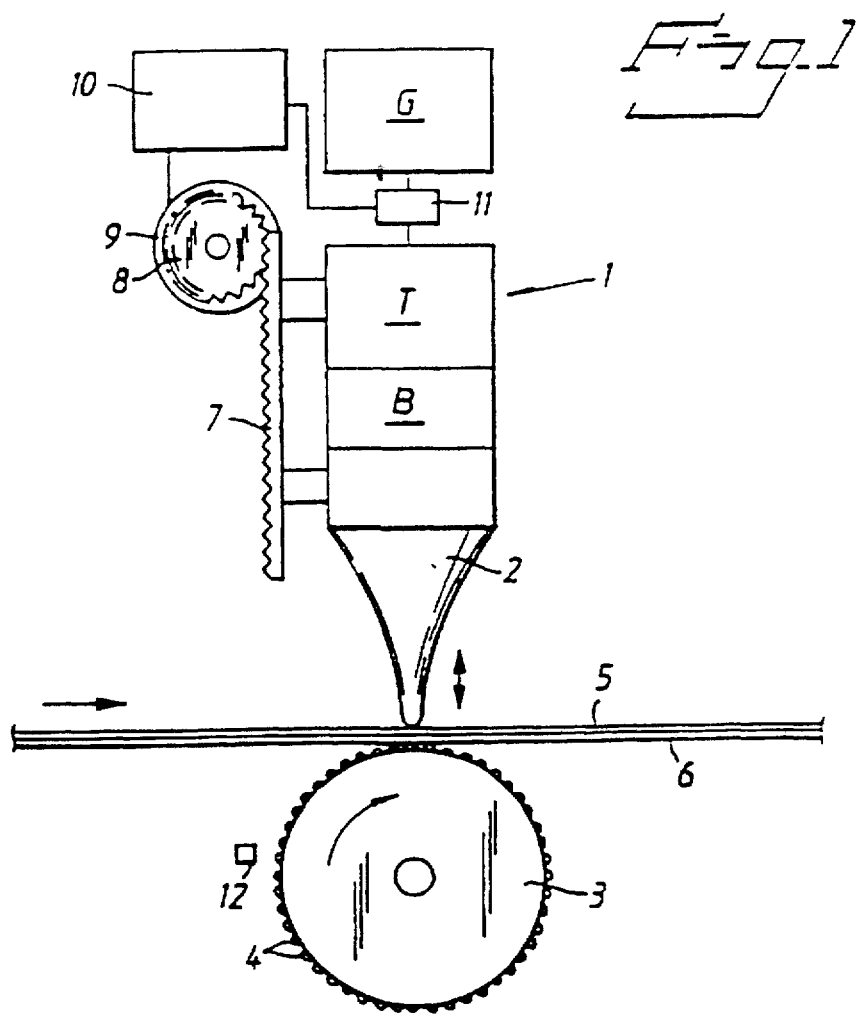

United States Patent
Wannebo

[11] Patent Number: 5,749,987
[45] Date of Patent: May 12, 1998

[54] METHOD OF CONTROLLING THE POWER OF A WELDING UNIT IN ULTRASONIC WELDING OPERATIONS AND AN ARRANGEMENT FOR CARRYING OUT THE METHOD

[75] Inventor: Andreas Wannebo, Lindome, Sweden

[73] Assignee: Molnlycke AB, Gothenburg, Sweden

[21] Appl. No.: 564,094

[22] PCT Filed: Jun. 14, 1994

[86] PCT No.: PCT/SE94/00586

§ 371 Date: Dec. 13, 1995

§ 102(e) Date: Dec. 13, 1995

[87] PCT Pub. No.: WO95/00316

PCT Pub. Date: Jan. 5, 1995

[30] Foreign Application Priority Data

Jun. 17, 1993 [SE] Sweden .................. 9302106

[51] Int. Cl.$^6$ .................................................. B32B 31/00
[52] U.S. Cl. ...................... 156/64; 156/73.1; 156/358; 156/580.1
[58] Field of Search ................. 156/64, 73.1, 358, 156/359, 378, 580.1

[56] References Cited

U.S. PATENT DOCUMENTS

| | | | |
|---|---|---|---|
| 3,666,599 | 5/1972 | Obeda | 156/538 |
| 4,087,297 | 5/1978 | Johnson | 156/73.4 |
| 4,313,778 | 2/1982 | Mims | 156/358 |
| 4,373,982 | 2/1983 | Kreager et al. | 156/359 |
| 4,823,713 | 4/1989 | Ogawa et al. | 156/580.1 X |

FOREIGN PATENT DOCUMENTS

| | | |
|---|---|---|
| 1385106 | 11/1964 | France. |
| 3313918 | 10/1983 | Germany. |
| 63-315223 | 12/1988 | Japan. |
| 451 972 | 11/1987 | Sweden. |

Primary Examiner—David A. Simmons
Assistant Examiner—Paul M. Rivard
Attorney, Agent, or Firm—Young & Thompson

[57] ABSTRACT

A method and device for controlling the power intake of a welding unit (1) with an ultrasonic horn (2) and an anvil holder (3) equipped with anvils (4). The mean distance of the ultrasonic horn (2) from the anvil (4) is controlled so that the power intake of the welding unit (1) will coincide with a predetermined control value.

9 Claims, 1 Drawing Sheet

METHOD OF CONTROLLING THE POWER OF A WELDING UNIT IN ULTRASONIC WELDING OPERATIONS AND AN ARRANGEMENT FOR CARRYING OUT THE METHOD

The present invention relates to a method of controlling the power of a welding unit when ultrasonic welding webs of material which pass between an ultrasonic horn of the welding unit and an anvil holder equipped with anvils. The invention also relates to a welding arrangement for carrying out the method.

In ultrasonic welding, the materials to be joined together are worked mechanically by moving the end of an ultrasonic horn up and down in the material at a frequency which lies within the ultrasonic frequency band. This mechanical working of the material results in an internal friction which generates heat in the material, therewith causing the material to melt in the region worked by the ultrasonic horn and the materials located between horn and anvil to fuse together. The amount of heat generated in the material will, of course, depend on the extent to which work is carried out and when this work is too low, the weld between the materials will be weak or non-existent, whereas when the work is excessively high, the materials are perforated.

In recent times, the use of ultrasonic welding for joining together the outer sheets of absorbent articles has become progressively more usual. When an ultrasonic welding unit is used to this end, problems are encountered in obtaining continuously high-quality weld joins. This is because a number of factors which influence the welding conditions vary during the continuous operation of an absorbent article process line. Examples of these factors include thermal expansion of the welding unit or the anvil as a result of variations in ambient temperatures, variations in the thickness of the materials to be joined, wear primarily on the ultrasonic horn, and variations in the speeds of the webs passing between the ultrasonic horn and the anvil.

An object of the present invention is to solve this problem.

This object is achieved in accordance with the invention by means of a method of the kind defined in the introduction which is characterized by controlling the mean distance of the ultrasonic horn from the anvil in a manner such that the power of the welding unit will coincide with a predetermined control value. Surprisingly, it has been found that such power regulation results in high-quality weld joins when the welding unit is operated continuously.

According to one preferred embodiment of the invention, the control value is varied as a function of the web speeds, and in one variant of this embodiment, the control value is determined as a function of the web speeds by determining experimentally the constants of and the break points between three consecutive linear functions.

The invention also relates to an ultrasonic welding arrangement for joining together webs of material which pass between an ultrasonic horn of an ultrasonic welding unit and an anvil holder equipped with anvils. The arrangement is characterized by means for measuring and indicating the power input to the welding unit, means for moving the ultrasonic horn so as to change its mean distance from the anvil, and means for comparing the measured power input with a control value and controlling the ultrasonic horn-moving means in accordance with the difference between the measured power and the control value.

Figure 2:
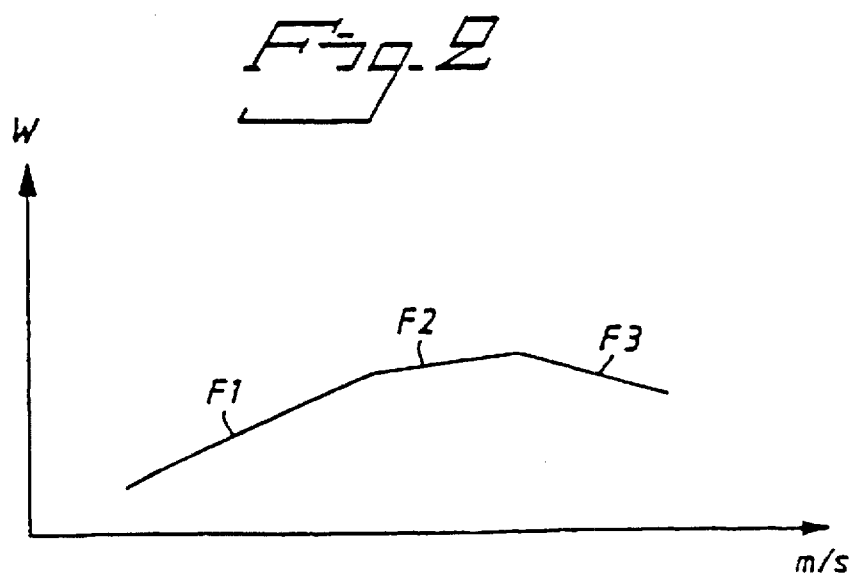

A preferred embodiment of the invention will now be described in more detail with reference to the accompanying drawings, in which FIG. 1 illustrates schematically and from one side an ultrasonic welding arrangement according to one preferred embodiment of the invention; and FIG. 2 is a curve of the control value as a function of the speed at which the webs of material move.

The ultrasonic welding arrangement illustrated in FIG. 1 includes an ultrasonic welding unit 1 which is comprised typically of an electric high-frequency generator G, a transductor T, which converts the high-frequency electric energy to mechanical energy, an amplifier B which increases the amplitude of the mechanical oscillations, and an ultrasonic horn 2 which is connected to the amplifier B so that its mechanical oscillations are transmitted to the horn in the form of reciprocating motion in the longitudinal direction of the unit 1, as indicated by a double arrow in FIG. 1.

The components of the unit 1 may be of any appropriate kind. For instance, the generator G and the transductor T may be of the kind sold by Dukane Corp., Illinois, U.S.A., under the designations 20A2000 and 41C30 respectively.

The arrangement also includes an anvil roll 3 which has a number of anvil forming projections 4 disposed in a selected pattern on its peripheral surface. Although not shown, the arrangement includes means for moving the webs of material 5, 6 to be joined together through the nip between the peripheral surface of the anvil roll 3 and the end of the ultrasonic horn 2, said means being of any known type. When the arrangement is working, the anvil roll is rotated at a speed at which its peripheral speed will coincide with the speed at which the webs 5, 6 move. The direction in which the webs move and the direction in which the anvil roll rotates are shown by arrows in FIG. 1.

In order to enable the distance between the horn 2 and anvil 4 to be adjusted, the horn is slidably suspended in a direction perpendicular to the direction of movement of the webs, i.e. in the longitudinal direction of the welding unit, and means are provided for moving the horn. In the embodiment illustrated in FIG. 1, the horn-moving means has the form of a vertically movable rack 7, which is firmly attached to the welding unit 1, and a fixed toothed wheel 8 which is rotated by an AC-motor 9, preferably a stepping motor. It will be understood, however, that the horn-moving means may comprise a screw-nut arrangement or any appropriate type of linear prime mover that can be controlled with the requisite precision.

The arrangement also includes a control unit 10, preferably a minicomputer, for controlling the AC-motor 9, and a device 11 which functions to deliver to the control unit a signal that indicates the instantaneous or current power consumption or power intake of the ultrasonic welding unit. The device 11 may comprise an energy module from Dukane Corp., Illinois, U.S.A., designated 438–639, although other types of power indicators may be used, of course. The control unit 10 and the generator G are connected to an electric power source (not shown), for instance to the main supply. A speedometer 12 of any suitable kind is included to measure the speed at which the anvil roll 3 rotates and to send to the minicomputer a signal indicative of this speed, whereupon the minicomputer calculates the web movement speed on the basis of this signal.

When the described arrangement is in operation, the welding unit is set so that the vertical reciprocating movement of the ultrasonic horn, this movement having a frequency of about 20 kHz, will have constant amplitude. The work carried out by the welding unit, which is proportional to the extent to which the webs are compressed between horn 2 and anvil 4, is then directly dependent on the distance between horn and anvil. This is utilized in accordance with the invention, in that the work carried out by the welding unit is controlled by controlling the mean distance between horn and anvil in a manner such that the work performed will cause the webs to fuse together sufficiently to obtain a weld joint of sufficient strength.

The energy delivered to the welding unit 1 is proportional to the work carried out, and by measuring continuously the power supplied with the aid of the device 11, there is obtained a measurement of the instantaneous work performed. It has been found possible to obtain continuously a weld joint of acceptable quality, by controlling the distance of the ultrasonic horn from the anvil as a function of the power delivered to the welding unit so that said power coincides with a predetermined control value. The control value is determined experimentally, by test-welding applicable webs of material.

Acceptable weld joints can be obtained when test-welding at different web speeds when the power intake of the welding unit is kept constant. It was found, however, that the tensile strength of the resultant weld joint decreased with increasing web speeds, meaning that the weld joint obtained at lower web speeds becomes unnecessarily strong when the arrangement is regulated to maintain a constant control value. Thus, the power output should be varied as a function of web speed in order to obtain a weld joint of more uniform quality.

When test-welding to find a suitable relationship between power and web speed, it was surprisingly found that the control value as a function of web speed can be approximated with good precision with a curve constructed from three consecutive linear functions F1, F2, F3, as shown schematically in FIG. 2. It will be seen from FIG. 2, that in order to maintain the obtained weld joint at uniform quality, the power intake of the welding unit shall increase with increasing web speed at low and average web speeds (functions F1 and F2), whereas the power intake shall decrease at increasing web speeds in the case of high web speeds (function F3). No absolute values of power and speeds have been given in this Figure, because these values will vary in accordance with the properties of those materials to be welded. It can be mentioned, however, that the material normally used as the outer sheet of an absorbent disposable article, such as a diaper, sanitary napkin and incontinence guard, has been test-welded at web speeds of between 0–160 m/min. and the weld joints were found to have a uniform quality when the control value of the power was adjusted to follow a curve of principly the same shape as the curve shown in FIG. 2.

The aforesaid approximation facilitates considerably determination of the control value curve for those different combinations of web material that can be joined together in the inventive arrangement, by needing to measure only a few values when test-welding, in order to determine the slopes and absolute values of the linear functions in the control-value curve and the break points of the curve.

The arrangement operates in the following manner:

Firstly, the control value is determined as a function of the speed at which the webs move in a test-welding run, while using the aforesaid approximation, and the curve is programmed in the minicomputer 10. The arrangement is then ready for operation. It will be understood that control curves for different combinations of web material of mutually different thicknesses and thermoplastic properties can be programmed in the computer prior to beginning operation and that instructions as to which combination the computer shall use are keyed into the computer prior to starting-up the arrangement.

When the arrangement is in operation, the computer 10 controls the horn-moving means 7–9 so that the power intake of the welding unit will coincide with the control value for the relevant web moving speed in accordance with the predetermined control curve for the relevant combination of web parameters. If the device 11 indicates that the power exceeds the control value, the computer 10 will send a signal to the horn-moving means 7–9 which, in response, increases the distance between horn 2 and the anvil roll 3, whereas the distance is decreased when the power input lies beneath the control value. If the power intake of the welding unit is influenced by factors other than the speed at which the webs move, as is often the case, such as by changes in the thickness of the material, changes in length of the welding unit due to changes in temperature, and so on, the distance between horn and anvil is adjusted in a corresponding manner. The present invention thus enables the extent to which the materials are worked between horn and anvil to coincide, within controlling tolerances, with a value that has been earlier determined experimentally and that will provide a sufficiently strong join, by controlling the power input to the welding unit.

It will be understood that the arrangement can be modified within the scope of the invention. When welding is to be effected at one single web speed, power input to the welding unit is controlled towards a constant control value and it is unnecessary to provide the control unit with speed-related information. It is sufficient, in many cases, to control said power input towards a constant control value within the speed range F2, in order to obtain a joint of homogenous quality. Further, the method may also be applied, of course, with stationary anvils or with anvils that are mounted on a linearly moving anvil holder. Other types of welding units than the aforedescribed can be used and also operated at frequencies other than the aforesaid frequency of 20 kHz. The aforedescribed arrangement can also be used to join together more than two webs of material, and materials which are not thermoplastic can also be used provided that they coact with thermoplastic materials. The invention is thus solely limited to the content of the following claims.

I claim:

1. A method of controlling the power of a stationary welding unit when ultrasonically welding webs of material (5, 6) which pass between an ultrasonic horn (2) of the welding unit (1) and an anvil holder (3) equipped with anvils (4), comprising controlling a mean distance of the ultrasonic horn (2) from the anvil (4) so that power for the welding unit coincides with a predetermined control value.

2. A method according to claim 1, wherein the control value is constant.

3. A method according to claim 1, further comprising the step of varying the control value as a function of a speed at which the webs (5,6) move.

4. A method according to claim 1, further comprising the step of determining the control value experimentally.

5. A method according to claim 3, wherein the control value as a function of the speed at which the webs (5, 6) move is determined by establishing experimentally constants of and break points between three consecutive linear functions (F1, F2, F3).

6. An ultrasonic welding device for mutually joining webs of material (5, 6) which pass between an ultrasonic horn (2) of a stationary ultrasonic welding unit (1) and an anvil holder (3) equipped with anvils (4), the device comprising means (11) for measuring and indicating a power intake of the unit (1), means (7–9) for moving the ultrasonic horn (2)

so as to change its mean distance from the anvil (4); and means (10) for comparing the measured power with a control value and controlling the horn-moving means (7–9) in accordance with the difference between the measured power and the control value.

7. The device according to claim 6, further comprising means (12) for determining a speed at which the webs (5, 6) move and that delivers to the means (10) a signal which is indicative of said speed.

8. The device according to claim 6, further comprising the anvil holder that is comprised of an anvil roll (3) which has a pattern of the anvils (4) provided on its peripheral surface and which rotates so that a peripheral speed of the roll will coincide with a speed at which the webs (5, 6) move.

9. The device according to claim 6, further comprising the ultrasonic horn wherein said horn (2) is slidably suspended in a direction perpendicular to a direction of movement of the webs (5, 6); and wherein the horn-moving means (7–9) include a rotatable drive wheel (8) driven by an electric motor (9).

* * * * *